(12) United States Patent
Buelow, II et al.

(10) Patent No.: US 7,330,632 B1
(45) Date of Patent: Feb. 12, 2008

(54) FIBEROPTIC LUMINAIRE WITH SCATTERING AND SPECULAR SIDE-LIGHT EXTRACTOR PATTERNS

(75) Inventors: Roger F. Buelow, II, Gates Mills, OH (US); William J. Cassarly, Wooster, OH (US); Thomas L. R. Davenport, Tucson, AZ (US); John M. Davenport, Middleburg Heights, OH (US); Chris H. Jenson, Twinsburg, OH (US)

(73) Assignees: Energy Focus, Inc., Solon, OH (US); Optical Research Associates, Pasadena, CA (US)

( * ) Notice: Subject to any disclaimer, the term of this patent is extended or adjusted under 35 U.S.C. 154(b) by 0 days.

(21) Appl. No.: 11/466,645

(22) Filed: Aug. 23, 2006

(51) Int. Cl.
*G02B 6/00* (2006.01)
*F21S 8/06* (2006.01)
(52) U.S. Cl. .................. 385/146; 385/141; 362/92; 362/551; 362/576
(58) Field of Classification Search .............. None
See application file for complete search history.

(56) References Cited

U.S. PATENT DOCUMENTS

| | | | |
|---|---|---|---|
| 3,535,018 A | 10/1970 | Vasilatos | |
| 4,585,298 A | 4/1986 | Mori | |
| 4,765,701 A | 8/1988 | Cheslak | |
| 4,941,723 A | 7/1990 | Sasada | |
| 5,987,199 A | 11/1999 | Zarian et al. | |
| 6,039,553 A | 3/2000 | Lundin et al. | |
| 6,289,150 B1 | 9/2001 | Zarian et al. | |
| 2006/0140562 A1* | 6/2006 | Joseph et al. | 385/124 |
| 2006/0152931 A1* | 7/2006 | Holman | 362/297 |

OTHER PUBLICATIONS

US 6,419,383, 07/2002, Lundin (withdrawn)

* cited by examiner

*Primary Examiner*—Tina M. Wong
(74) *Attorney, Agent, or Firm*—Charles E. Bruzga; Bruzga & Associates (57) ABSTRACT

Fiberoptic luminaire with scattering and specular side-light extractor patterns comprises a fiberoptic light pipe with elongated side-fight emitting portion. Such portion illuminates a target area with a scattering, and a specular, light extractor pattern. The extractor patterns are arranged to extract light from the side-light emitting portion over a radial angle, orthogonal to said main axis, of less than 180°. The scattering extractor pattern atone may provide greater than 50% of light on the target area, and light extracted by the specular extractor pattern alone may produce an illuminance on a selected portion of the target area that is greater than 5% of the maximum illuminance produced on the target area by the scattering extractor pattern. Furthermore, the scattering extractor pattern may comprise a Lambertian type of extractor pattern. Each specular extractor pattern may comprise a notch having main faces parallel to within 10° of each other.

24 Claims, 10 Drawing Sheets

FIBEROPTIC LUMINAIRE WITH SCATTERING AND SPECULAR SIDE-LIGHT EXTRACTOR PATTERNS

FIELD OF THE INVENTION

The present invention relates to fiberoptic luminaires with scattering and specular side-light extractor patterns. More particularly, the invention relates to such a fiberoptic luminaire wherein a scattering extractor pattern provides more side light than a specular extractor pattern, but wherein the specular extractor pattern allows more control in directing extracted light in a desired direction.

BACKGROUND

The following two U.S. patent applications describe the use of fiberoptic luminaires that may be used for lighting refrigerated or other types of cases for displaying food or other contents: U.S. patent application Ser. No. 11/379,997 filed Apr. 24, 2006 for Lighted Refrigerated Display Case with Remote Light Source by Roger Buelow et al., and U.S. patent application Ser. No. 11/379,999 filed 24 Apr. 2006 for Lighted Display Case with Remote Light Source by Roger Buelow et al. The foregoing applications have some common inventors with the present application, and they are assigned to the same joint owners as the present application: the joint owners are Fiberstars, Inc. and Optical Research Associates. The entireties of the disclosures of the foregoing applications are hereby incorporated by reference.

The foregoing U.S. patent applications disclose fiberoptic luminaires with extractor patterns for extracting light from the side of the luminaires. The extractor patterns may comprise light-scattering particles or a textured pattern on the surface of a luminaires by way of example. As used herein, "fiberoptic luminaire" includes an acrylic rod luminaire that receives light directly from a light source as well as indirectly through a fiberoptic cable or other structure. Typically, the foregoing paint or textured-pattern surfaces comprise a scattering-type extractor pattern, as opposed to a specular-type extractor pattern.

As used herein, an extractor pattern, of either the scattering or specular type, produces a continuous swath of light on a target area.

As used herein, some extractor patterns are categorized as "scattering" extractor patterns and others are categorized as "specular" extractor patterns. These terms are in more detail below in the detailed description below. Generally, a scattering extractor pattern for light on an elongated luminaire tends to provide light onto a target area, along the length of the luminaires with a moderate degree of directional control over the light in the length direction. In the direction orthogonal to the length, the scattering extractor pattern density and the cross sectional shape of the elongated luminaire provide a smooth target distribution that is free of localized spatial structure but still provides good directional control. Scattering extractor patterns are relativity insensitive to fabrication errors.

In contrast, a specular extractor pattern can provide light along the length of a luminaire with more localized control than can a scattering extractor pattern.

Sometimes, it would be desired to not only utilize a scattering extractor pattern on a luminaire but also be able to exert a higher degree of longitudinal directional control over some of the light emitted by the luminaires. In some cases, this longitudinal directional control can provide more localized control over the target distribution, thereby enabling improved uniformity and a reduction in the fraction of light that spills outside of the target area.

BRIEF SUMMARY OF THE INVENTION

One embodiment of the present invention provides a luminaire with scattering and specular side-light extractor patterns. The luminaire comprises a fiberoptic light pipe having a light-carrying core. The light pipe has, in addition to a main axis, an elongate side-light emitting portion of the light pipe which emits light from the side of the light pipe to illuminate a target area. The tight pipe emits light from the side by a side-light extractor pattern arrangement comprising a scattering and specular extractor pattern for tight, each of which directs light onto the target area. The scattering and specular extractor patterns are positioned on the side-light emitting portion to extract light from the side-light emitting portion over a radial angle, orthogonal to the main axis, of less than 180°.

In one embodiment, the scattering extractor pattern comprises a Lambertian type of extractor pattern and the specular extractor pattern comprises some or all of the surface areas of one or more notches in the side-light emitting portion. Each notch has a pair of main faces parallel to within 10° of each other. For this embodiment, the specular extractor pattern extends over less than 20% of a length of the side-light extractor pattern arrangement along the said main axis.

in another embodiment, the scattering and specular extractor patterns differ from each other in shape and type. Lastly, the scattering extractor pattern may provide greater than 50% of light.

The foregoing embodiments of the invention utilize both scattering and specular extractor patterns for fight to illuminate an elongated target area. This allows a higher degree of directional control over some of the light emitted by a luminaire than by using only a scattering extractor pattern. In some cases, the higher longitudinal directional control provides more localized control over the target distribution, thereby enabling improved uniformity and a reduction in the fraction of light that spills outside of the target area.

Other features and advantages of the invention will become apparent from the following specification in connection with the appended drawings in which same reference numerals refer to like parts.

BRIEF DESCRIPTION OF THE DRAWINGS

FIGS. 5A, 6B and 6C are, respectively, top view, side view and top perspective view, partially in block form, of a portion of a luminaire near its input end and a light source.

FIG. 5C is also similar to FIG. 8A, but shows a specular extractor pattern notch on the lower side of a luminaire.

DETAILED DESCRIPTION OF THE INVENTION

This description covers the three topics of (1) general considerations, (2) exemplary embodiments, and (3) variations in specular and scattering extractor patterns.

General Considerations

Figure 1A:
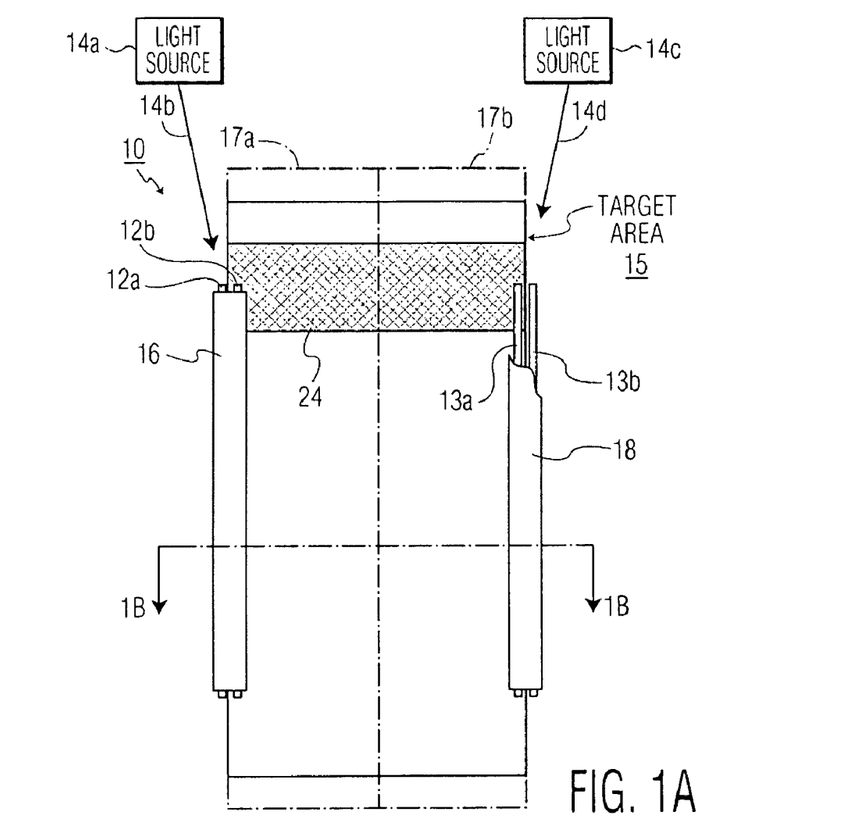
FIG. 1A is a simplified side view of two pairs of fiberoptic luminaires, partially covered by respective reflectors, one of which is partially cut away, together with a target area and phantom illustration of doors of a display case.
Figure 1B:
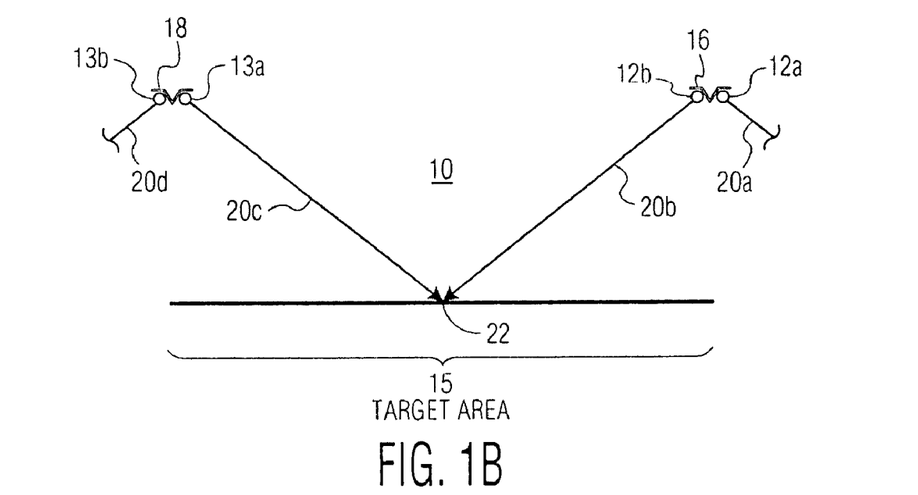
FIG. 1B is a simplified cross-sectional view of the luminaires, reflectors and target area of FIG. 1A taken at Arrows 1B-1B in FIG. 1A.

FIGS. 1A and 1B show an arrangement 10 of pairs of luminaires 12a, 12b and 13a, 13b. Pair of luminaires 12a, 12b may be provided with a reflector 16, and pair of luminaires 13a, 13b may be provided with a similar reflector 18. Luminaires 12a, 12b are provided with light from a light source 14a via the direction shown by an arrow 14b. Similarly, luminaires 13a and 13b are provided with light from a tight source 14c—which may coincide with tight source 14a—from the direction shown by an arrow 14d. Luminaire 12b and luminaire 13a illuminate a rectangular target area 15 between them, the target area extending higher than an upper end of the side-light emitting portion of the luminaires along a main axis of one of the luminaires. Target area 15 may be food or other contents of a display case (not shown), which is usually placed on shelves in the display case. Shown in phantom in FIG. 1A are exemplary doors 17a and 17b of the display case, which usually have hinges (not shown) extending vertically in front of the luminaires that are preferably mounted within the case The display case may be refrigerated, if desired, to a temperature below 7C, in which case fiberoptic light delivery means (not shown) typically supplies light to the luminaires from above.

FIG. 1B shows light rays 20a, 20b, 20c and 20d. Exemplary rays 20b and 20c, from luminaires 12b and 13a, respectively, converge at a point 22 on target area 15. Of course many other rays (not shown) from luminaires 12b and 13a converge on other points of target area 15, whereby the output from these luminaires combine to illuminate the target area.

It is occasionally desirable to provide a section of target area 15 with additional light beyond that which a scattering extractor pattern on a luminaire can provide. FIG. 1A shows section 24, cross-hatched for convenience, as an exemplary section on which additional light is desired. As mentioned above, an extractor pattern of either the scattering or specular type, produces a continuous swath of light on a target area.

Figure 2:
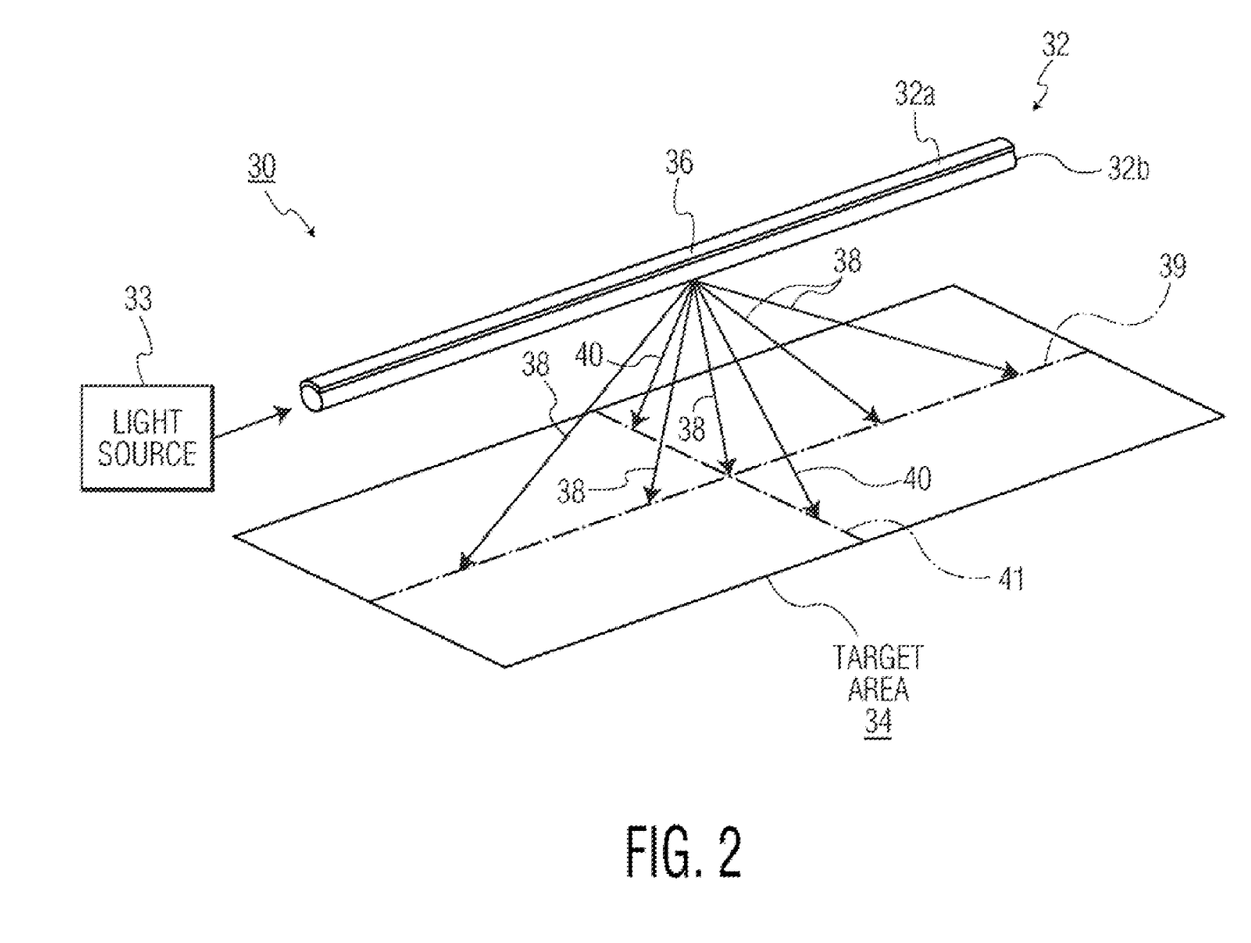
FIG. 2 is an upper perspective view of a fiberoptic luminaire with a scattering extractor pattern for light, showing light rays reaching a target area.

FIG. 2 illustrates the lack of a high degree of directionality for light extracted from a luminaire by a scattering extractor pattern. That figure shows an arrangement 30 of a single luminaire 32 employing a scattering extractor pattern 32a on a light-carrying member 32b. Scattering extractor pattern 32a, whose thickness is shown exaggerated, may comprise paint having titanium dioxide or other light-scattering particles, or may comprise a laser-etched pattern, by way of example. Light-carrying member 32b may comprise an acrylic rod. More particularly, luminaire 32 may be formed as described in the above-noted U.S. patent application Ser. Nos. 11/366,711 and 11/108,279. A light source 33 supplies light to luminaire 32.

Scattering extractor pattern 32a in FIG. 2 illuminates a target area 34 along the length of luminaire 32. Exemplary tight rays 38 from a single longitudinal position 36 reach target area 34 along a lengthwise line 39, and exemplary light rays 40 from such position 36 reach target area 34 along crosswise line 41. The extent of crosswise line 41 that receives light rays 40 depends on the circumferential coverage of luminaire 32 by extractor pattern 32a. Both the circumferential coverage of the extractor patterns and the cross sectional shape of the light carrying member wilt affect the radial angle of light exiting the luminaire. For a given rod shape, extractor pattern 32 is preferably arranged to extract tight from the luminaire over a radial angle, orthogonal to a main (i.e., lengthwise) axis of the luminaire, of less than 180°. Of particular concern for the present invention is that light rays 38 disperse from position 36 of the luminaire in a substantially Lambertian manner along lengthwise line 39, but in a more directional manner in along the crosswise line 41. As such, scattering extractor pattern 32a lacks a high degree of directional control of light it extracts in the longitudinal direction of the luminaire.

FIGS. 3 and 4A-4D help define the difference between a scattering extractor pattern and a specular extractor pattern. Extractor patterns will not only redirect the light so that the light can escape the luminaires but the extractor patterns wilt also change the angular distribution of the redirected light. The distinction between these two types of extractor patterns is related to the angular distribution of a source of light coupled into a side-light emitting portion of a luminaire. The source of tight can be a length of the luminaire lacking a side-light emitting portion. For a given source, 50% of the light will be contained within an X-degree cone angle. Similarly, light at a given angle will produce a distribution of light exiting an extractor pattern and the distribution can also be characterized with an encircled scattered light distribution. Scattering extractor patterns are defined herein such that less than 50% of encircled scattered flux from the extractor pattern is contained within X degrees. Conversely, 'specular' extractor patterns are defined herein as having more than 50% of the encircled scattered flux from the extractor pattern contained within X degrees. For both scattering and specular extractor patterns, the density of the extractor patterns is adjusted to match the desired target illumination distribution. In less precise terms, and only to illustrate the foregoing definitions light extracted by a scattering extractor pattern has a weak dependence upon the source's angular distribution and light extracted by a specular extractor pattern has a strong dependence on the source's angular distribution.

Figure 3:
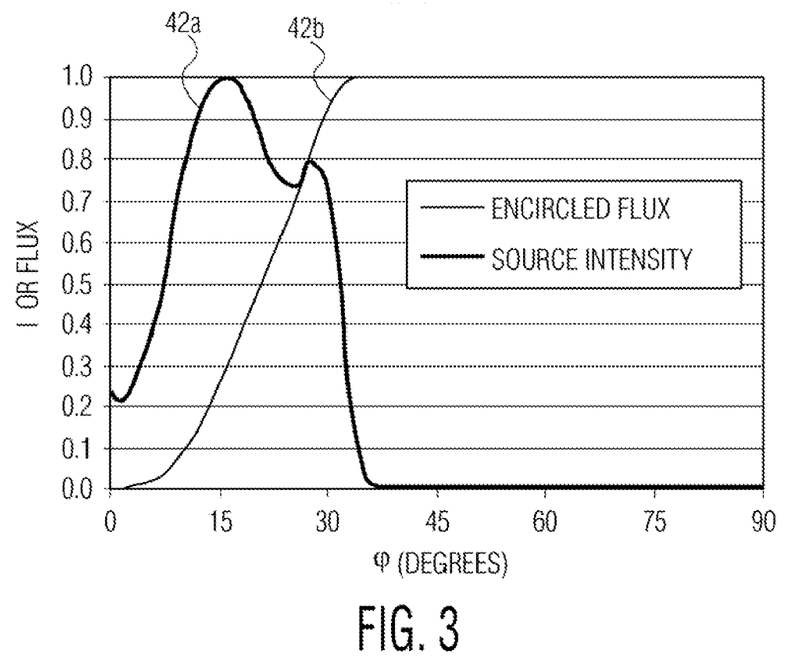
FIG. 3 is a plot of light source intensity and encircled flux versus a cone angle $\phi$ with respect to a main axis of tight propagation from the light source.

In FIG. 3, curve 42a shows source intensity for a light source that provides tight to a side-light emitting portion of a luminaire with a relatively constant cross section along its length.

Curve 42b shows the encircled flux according to the angle φ with respect to a main axis of light propagation. For use in ascertaining the foregoing distinction between specular and scattering extractor patterns, one considers encircled flux curve 42b to determine the angle φ containing 50% of the encircled flux. Such angle φ in FIG. 3 can be determined to be about 21°. In generating the plot of FIG. 3, the scatter distribution, I(θ), is integrated relative to the main direction of light propagation from the light source, to compute the portion of the flux that is within a given cone angle Phi=φ:

$$\text{Flux within } \phi = \frac{\int_0^\phi I(\theta)\cos(\theta)d\theta}{\int_0^\varphi I(\theta)\cos(\theta)d\theta}$$

For the specific case of a Gaussian distribution:
$I(\theta)=e^{-0.5*(\theta/\sigma)^2}$ and $$\text{Flux within } \phi = \frac{\int_0^\phi e^{-0.5*(\theta/\sigma)^2}\cos(\theta)d\theta}{\int_0^\varphi e^{-0.5*(\theta/\sigma)^2}\cos(\theta)d\theta}$$

Next, employment of the foregoing equation can be used for generating the plots of FIGS. 4A-4D, which relate to light reflecting from an extractor pattern for light. When using the foregoing equation, the scatter distribution, I(θ), is integrated relative to the specular direction of light reflection.

Figure 4A:
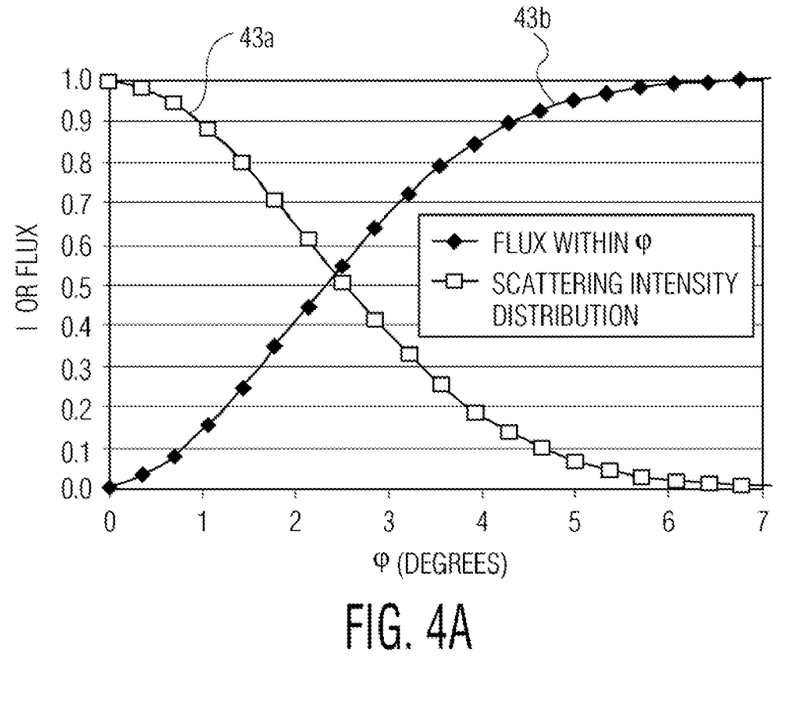
FIG. 4A is a plot of scatter distribution and encircled flux versus a cone angle $\phi$ with respect to the specular direction.

FIG. 4A shows a scatter distribution curve 43a for light reflected in the specular direction from an extractor pattern for light. Curve 43a represents the average scatter distribution for the whole extractor pattern. Curve 43b shows the flux within the cone angle φ. The plot of FIG. 4A is for 0<φ<7°, and for σ=5°/2.33=2.15°, where the Gaussian scatter is given by:

Gaussian Scatter $\propto e^{-0.5*(\theta/\sigma)^2}$

Figure 4B:
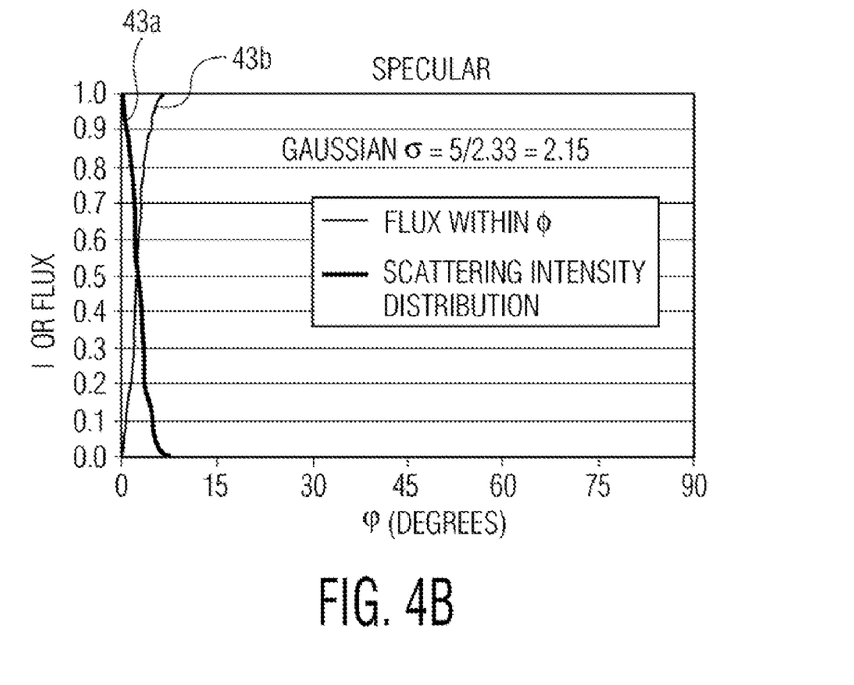
FIG. 4B shows the same plot but with $\phi$ varying over a wider range.

In FIG. 4A, the angle at which 50% of the light is contained is about 2.2°. FIG. 4B shows the same curves 43a and 43b as in FIG. 4A, but with φ varying over a wider range of angles, i.e., from 0 to 90°.

Figure 4C:
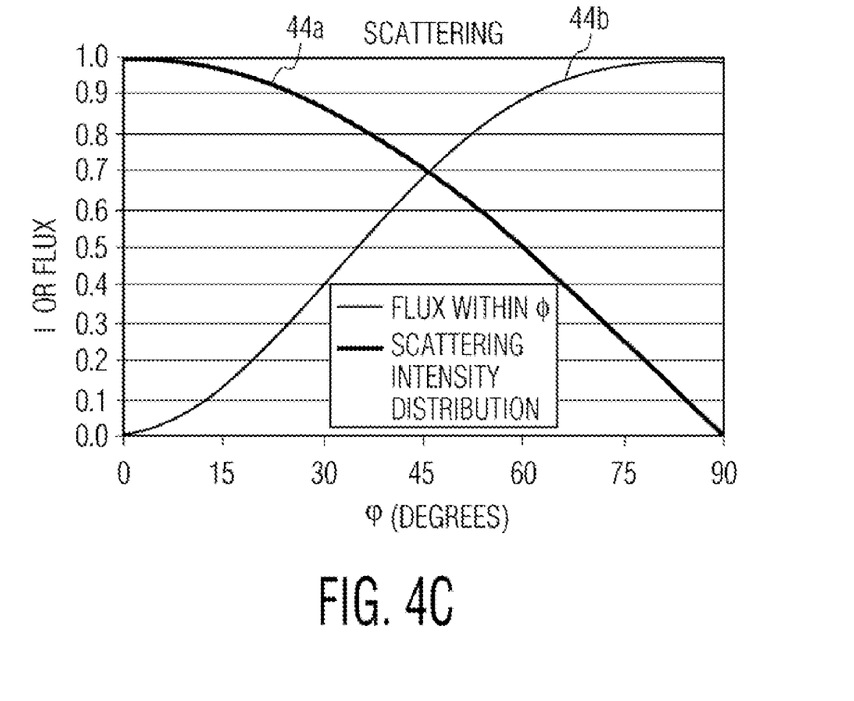
FIGS. 4C and 4D are plots of scatter distribution and encircled flux versus a cone angle $\phi$ with respect to the specular direction for the respective cases of a scattering extractor pattern and a borderline between specular and scattering extractor patterns.
Figure 4D:
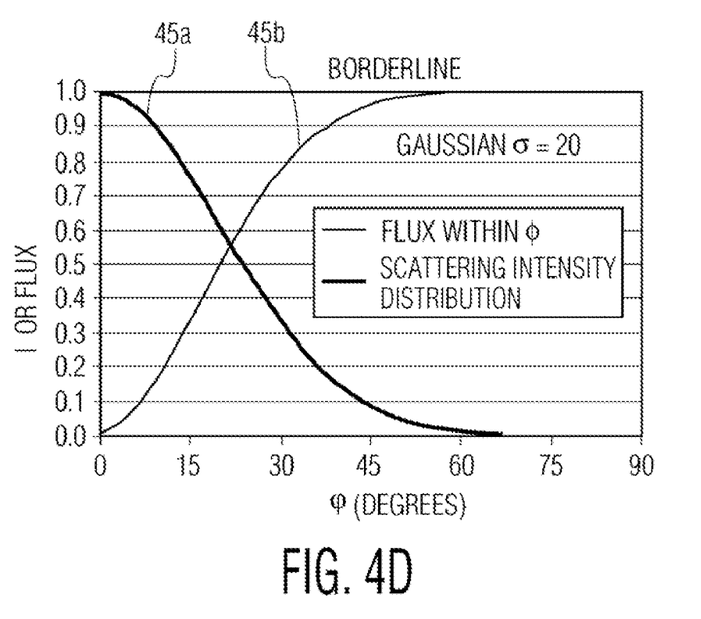

FIGS. 4C and 4D show plots similar to FIG. 4B for the respective cases of a scattering extractor pattern and a borderline between specular and scattering extractor patterns.

FIG. 4C shows a scatter distribution curve 44a and a flux within cone angle φ curve 44b for a scattering extractor pattern, wherein the distribution is Lambertian. A Lambertian scatter distribution is I(φ)=cos(φ).

FIG. 4D shows a scatter distribution curve 45a and a flux within cone angle φ curve 45b for a "borderline" Gaussian extractor pattern, wherein σ=20°. In particular, this figure represents a borderline case between a specular extractor pattern and a scattering extractor pattern, as those terms are defined herein.

Figure 5:
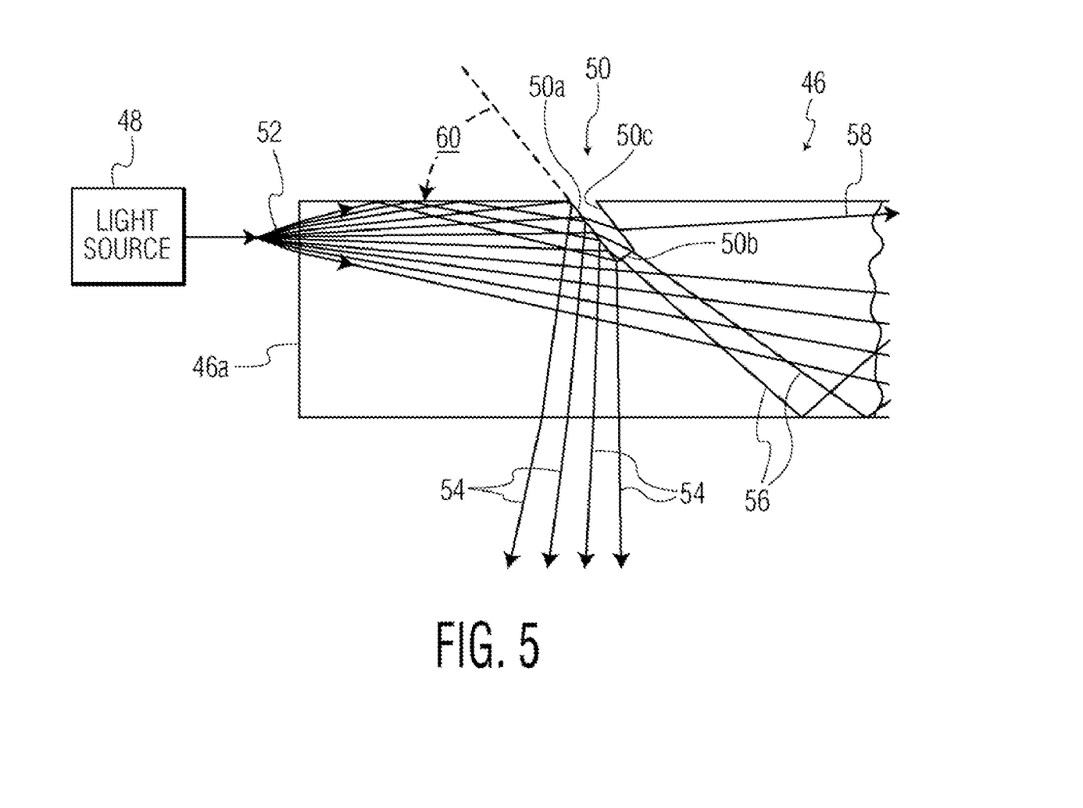
FIG. 5 is a simplified side view of a part of a luminaire with a specular extractor pattern notch for light and a light source, with tracings of light rays from the light source.

To illustrate optical properties of a specular extractor pattern, FIG. 5 shows a luminaire 46 that is supplied with light by a light source 48 and that includes a specular extractor pattern notch 50 for light. Extractor pattern notch 50 may comprise a notch with sides 50a and 50c and notch end face 50b. Surfaces 50a, 50b and 50c are assumed sufficiently smooth and planar to make notch 50 of the specular type, as defined above in connection with FIGS. 3 and 4A-4D. Although the specular extractor pattern notch 50 of FIG. 5 is described as having planar surfaces, other embodiments could use a notch (not shown) with non-planar surfaces. Further, if surfaces of a notch lack the requisite smoothness, then part or all of the notch surfaces will be a scattering extractor pattern (as defined above).

EXEMPLARY EMBODIMENTS

FIG. 5 shows light rays in the fan 52 passing from light source 48 into luminaire 46 via input end 46a of the luminaire. Some of the light rays in the fan 52 totally internally reflect on surface 50a of notch 50, and are directed downwardly as light rays 54 with a relatively high degree of directional control. Some of the light rays in the fan 52 refract at surfaces 50a and 50b before totally internally reflecting as light rays 56 on the lower surface of the luminaire and propagating along the luminaires. Some of the light rays 56 can be extracted from the light pipe by a further extractor pattern (not shown) in the luminaire. Similarly, one of the light rays 52 refracts at surfaces 50a and 50c and continues to propagate along the luminaire as light ray 58.

Surfaces 50a and 50c of specular extractor pattern notch 50 are preferably parallel to each other, or at least within about 10° of parallel to each other. This helps control the light (e.g., the angle of light ray 58) that passes through surfaces 50a and 50c and then propagates along the luminaire, where such light does not totally internally reflect downwardly in the manner of light rays 54.

The location and tilt angle 60 (FIG. 5) of notch 50 can be adjusted to control where the region of increased illuminance in the target area occurs. By changing the tilt angle 60, the region of increased illuminance does not have to be directly 'below' the notch—that is, differing from light rays 54. Instead, the increased-illuminance region can be decentered, along the length of luminaire 46, with respect to the location of the notch. For fabrication simplicity, light is redirected by the notch using total internal reflection (TIR), which imposes limits on how much light flux can be redirected since some of the light will propagate through the notch surface rather than being TIRed. In some embodiments, the surface of the notch can have a specular reflective coating applied to provide more control over where the light is redirected.

Figure 6A:
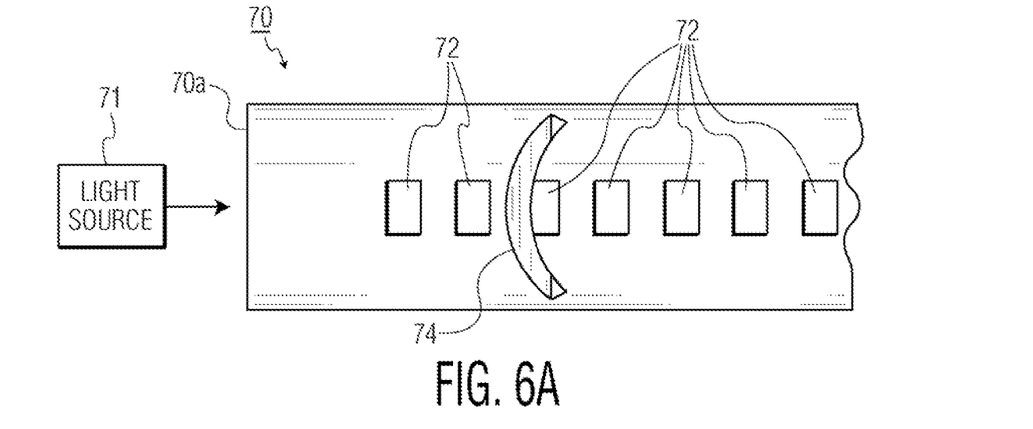
Figure 6B:
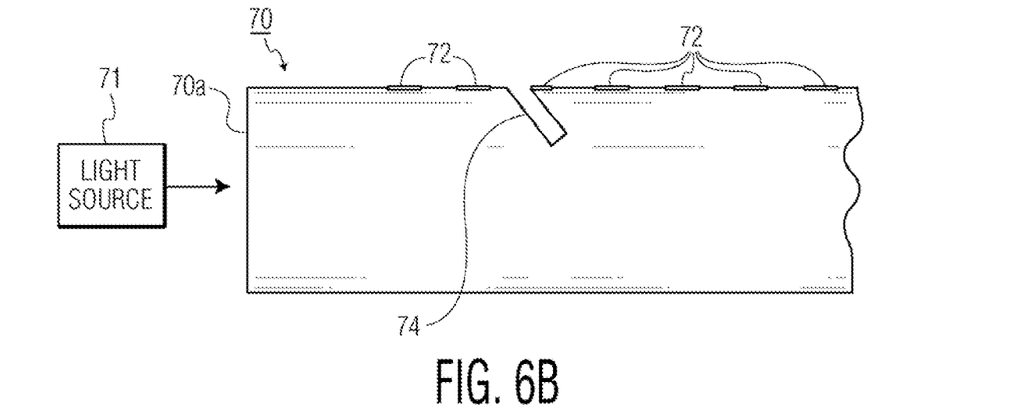
Figure 6C:
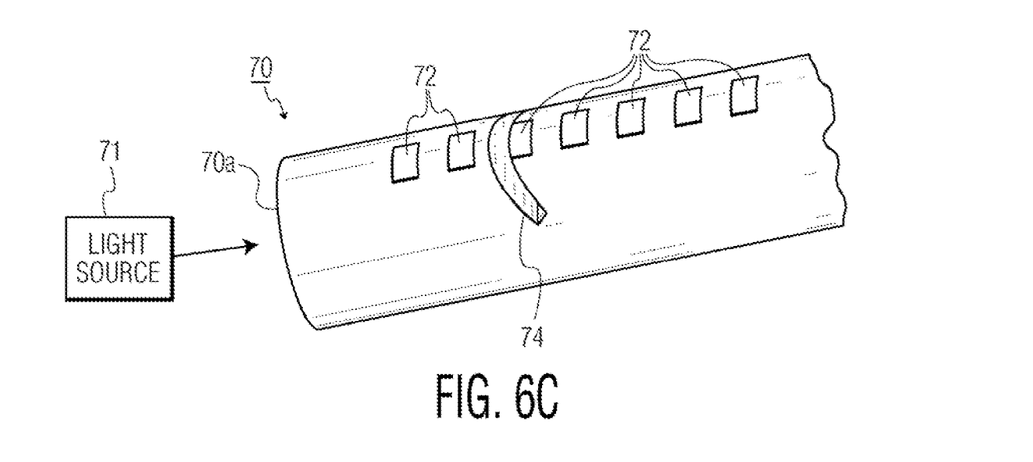

FIGS. 6A, 6B and 6C show a luminaire 70 containing both scattering and specular extractor patterns. A light source 71 supplies light to an input end 70a of the luminaire. A scattering extractor pattern 72 may comprise strips of paint, which may be applied according to the above-noted U.S. patent application Ser. Nos. 11/366,711 and 11/108, 279, and a specular extractor pattern 74 comprises a notch. The notch may be as described with respect to notch 50 of FIG. 5. Scattering extractor pattern 72 and specular extractor pattern 74 are each arranged to extract light from the luminaire over a radial angle of less than 180° with respect to the circumference of the luminaire. Specular extractor pattern 74 of FIGS. 6A, 6B and 6c overlaps scattering extractor pattern 72. Specular extractor pattern 74 preferably extends over less than 20% of the length of scattering extractor pattern 72, such as over less than 5% of the foregoing length.

In FIGS. 6A, 6B and 6C the respective circumferential center of each scattering extractor pattern 72 and specular extractor pattern 74, along the main axis of luminaire 70, may or may not be aligned. If the scattering and specular extractor patterns are not circumferentially aligned with each other, then the extractors may preferentially illuminate different parts of the target area.

FIGS. 7A-7D show various beneficial illuminance curves for a target area that can be achieved by incorporating one or more specular extractor patterns in a luminaire that also has a scattering extractor pattern.

Figure 7A:
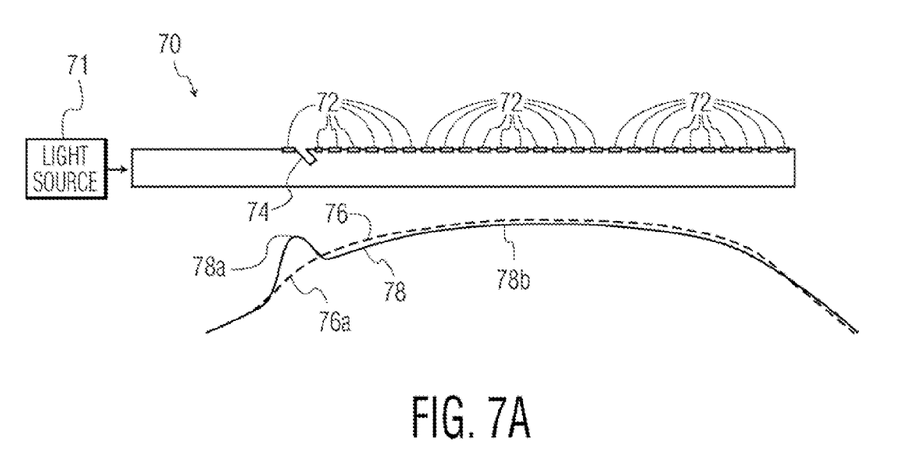
FIGS. 7A and 7B each show illuminance profiles in association with a respective, simplified luminaire whose side view is shown, together with a light source.

FIG. 7A shares reference numerals in common with FIGS. 6A-6C. Luminaire 70 in FIG. 7A provides an illuminance profile 76 for a target area (not shown) beneath the luminaire in the absence of specular extractor pattern 74; illuminance profile 76 has a relatively low illuminance in region 76a. In the presence of specular extractor pattern 74, luminaire 70 provides illuminance profile 78 with a relatively high peak 78a associated with the specular extractor pattern. Peak 78a may be a local peak in illuminance profile 78, or it may be a global peak—i.e. maximum value—of the profile. This shows that, by causing illuminance peak 78a, the specular extractor pattern can guide the light it extracts to a compact portion of the target area.

In the embodiment of FIG. 7A, as between scattering extractor pattern 72 and specular extractor pattern 74, the scattering extractor pattern preferably provides greater than 50% of light on a target area (not shown). The specular extractor pattern preferably produces an illuminance on a selected portion of the target area that is greater than 5%—and more preferably greater than 10%—of the illuminance produced on the mentioned "selected portion" by the scattering extractor pattern alone. In FIG. 7A, a "selected portion" of the target area corresponds to an area that contains the peak 78a of the illustrated illuminance profile and the increased illuminance on either side of the peak.

Figure 7B:
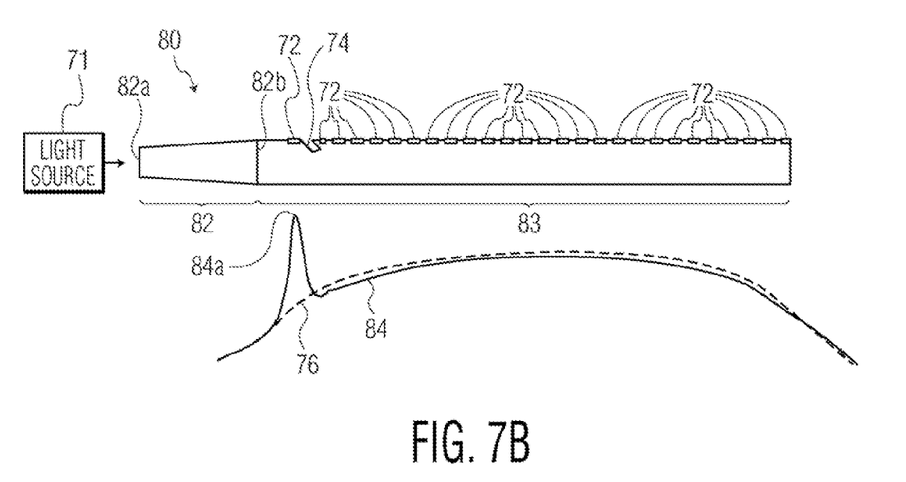

FIG. 7B shows a luminaire 80 that produces a more concentrated peak 84a of an illuminance profile 84 compared to peak 78a of FIG. 7A. In FIG. 7B, luminaire 80 has a tapered input section 82, and a section 83 having a constant cross section along its length. Like luminaire 70 of FIG. 7A, section 83 has scattering extractor pattern 72 and specular extractor pattern 74. Tapered input section 82 functions as an area-to-angle converter, such that the light received by section 83 at angles relative to the longitudinal axis of the luminaire decreases in value. In other words, the light received by section 83 at outlet 82b is more collimated—relative to the longitudinal axis of the luminaire—than light received by tapered section 80 at inlet 82a. As such, light rays (not shown) from light source 71 are more narrowly redirected downwardly towards some section of a target area (not shown) so as to create peak 84a of illuminance profile 84. As with luminaire 70 of FIG. 7A, without specular extractor pattern 74, an illuminance profile 76 is produced, and with specular extractor pattern 74, the mentioned peak 84a in profile 84 is created.

FIG. 7B illustrates the terminology "source of light" used in the definition of "specular" and "scattering" extractor patterns in Paragraph [00035] above. In particular, the "source of light" is the light provided to cylindrical section 83 of luminaire 80 through tapered section 82, with right-hand section 83 of the luminaire having a relatively constant cross section compared to tapered luminiare section 82.

Figure 7C:
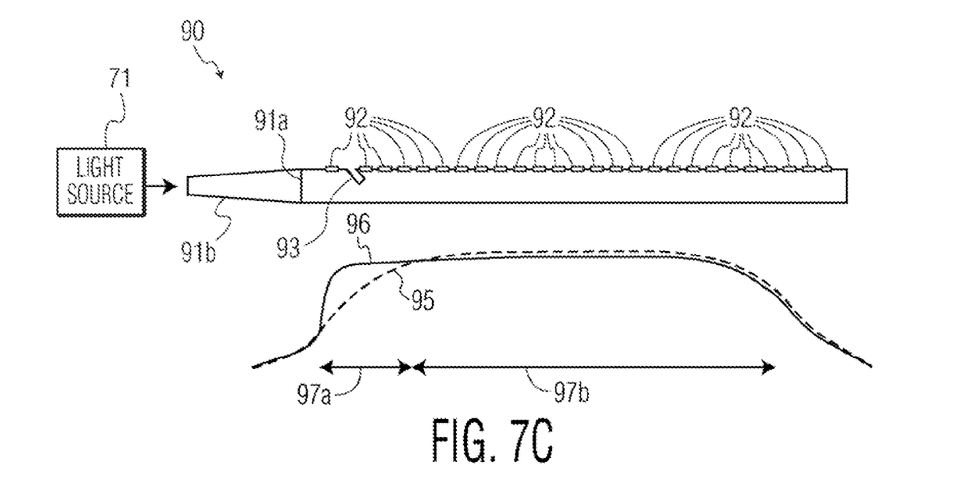
FIG. 7C is similar to FIG. 7B, but shows a different illuminance profile when using a specular extractor pattern.

FIG. 7C shows a luminaire 90, which like luminaire 80 of FIG. 7B, includes a scattering extractor pattern 92 and a specular extractor pattern 93. These extractor patterns may differ from the corresponding extractor patterns in luminaire 80, although the simplified view of FIG. 7C portrays them as alike. Illuminance profile 95 shows illuminance resulting only from scattering extractor pattern 92. The addition of specular extractor pattern 93 causes an illuminance profile 96 with increased illuminance in region 97a. Region 97a, together with region 97b, comprises a target area. In particular, the first 20% of length of the target area along the side-light emitting portion of the luminaire 90—i.e., to the right of outlet 91a of a tapered section 91b and specifically where light extractor patterns are located—from a light-receiving end of the luminaire, preferably receives sufficient light from specular extractor pattern 93 that the average illuminance on the foregoing length of the target area is at least a factor about 0.3 times the average illuminance along the full length of the target area along the side-light emitting portion of the luminaire. Preferably, the foregoing factor is about 0.7.

Figure 7D:
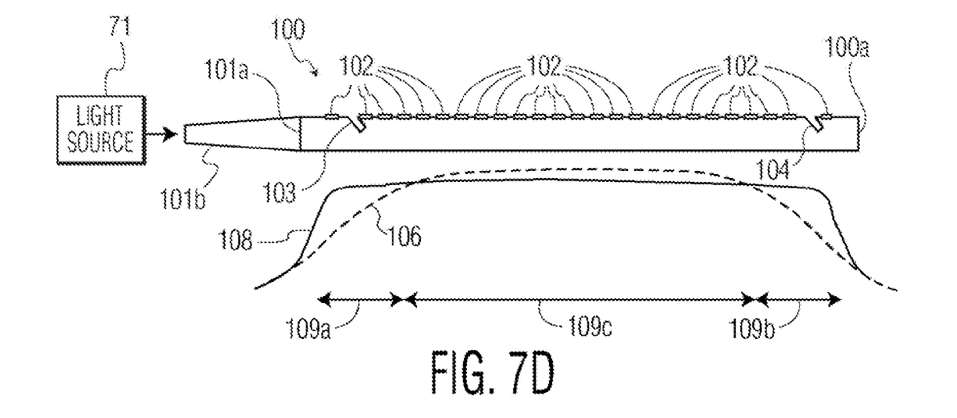
FIG. 7D is also similar to FIG. 7B, but shows a different illuminance profile when using specular extractor pattern notches near both an inlet and an outlet of a luminaire.

FIG. 7D shows a luminaire 100, which like luminaire 90 of FIG. 7C, includes a scattering extractor pattern 102 and a specular extractor pattern 103. Additionally, luminaire 100 includes a second specular extractor pattern 104 near end 100a of the luminaire distant from light source 71. As compared with an illuminance curve 106 resulting only from scattering extractor pattern 102, illuminance curve 108 resulting from all extractor patterns has a pair of regions 109a and 109b with an increase in illuminance. Regions 109a and 109b, together with intermediate region 109c, comprise a target area. Desirably, both the first and last 20% of length of the target area along the side-tight emitting portion of the luminaire 100 from a light-receiving end of the luminaire, preferably receives a significant amount of light from specular extractor pattern 103. By "significant" is meant that the average illuminance on the foregoing length of the target area is at least a factor about 0.3 times the average illuminance along the full length of the target area along the side-light emitting portion of the luminaire. Preferably, the foregoing factor is about 0.7. The side-light emitting portion of luminaire 100 is located to the right of outlet 101a of a tapered section 101b and specifically located where the extractor patterns are positioned.

Figure 7E:
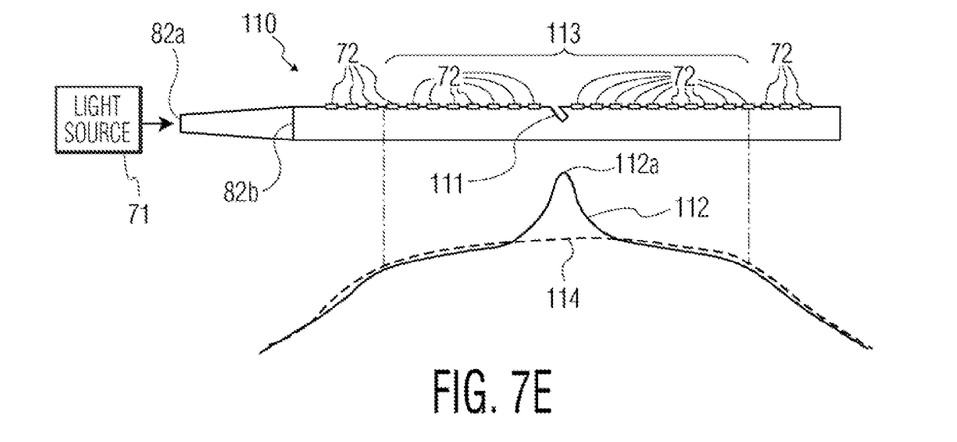
FIG. 7E is also similar to FIG. 7B, but shows a different illuminance profile when using a specular extractor pattern notch in a central region of a luminaire.

FIG. 7E shows a luminaire 110, which like luminaire 80 of FIG. 7B, includes a scattering extractor pattern 72 and a specular extractor pattern 111. However, specular extractor pattern 102 results in a distinct illuminance profile 112. Profile 112 has a peak 112a that is aligned with some portion of central section 113 of the length of the side-light emitting portion along the main axis of the luminaire. By selecting a radial orientation of specular extractor pattern 111 about the longitudinal axis of the luminaires peak 112a may be selectively positioned at one of various points in a target surface (not shown) along a direction orthogonal to the main axis of the luminaire. Such an arrangement is useful for providing a spotlight effect on the portion (not shown) of a target area associated with peak 112a. Central section 113 may comprise 60% of the length of the side-light emitting portion along the main axis of the luminaire, for instance. As shown, peak 112a is a global peak of illuminance from luminaire 110.

Variations in Specular and Scattering Extractor Patterns

FIGS. 8A-8B and 9A-9C show various configurations of specular extractor pattern notches that may be used.

Figure 8A:
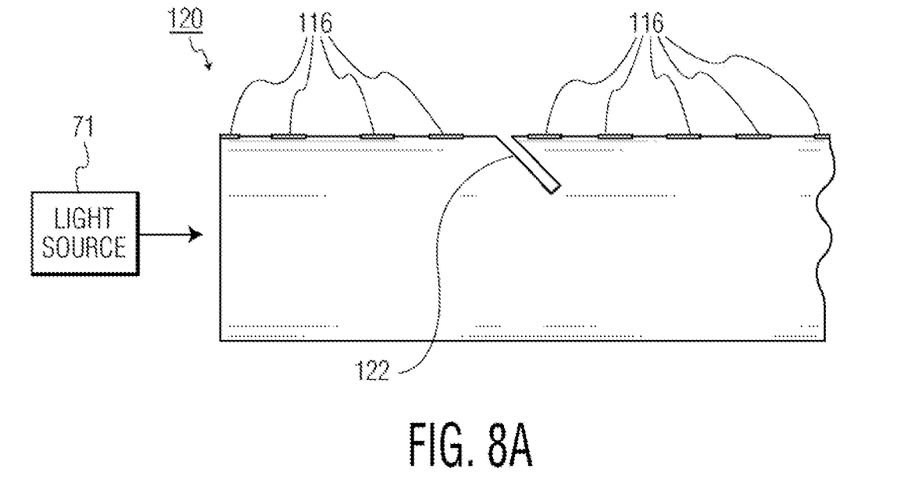
FIG. 8A is a simplified side view of a part of a luminaire showing a single specular extractor pattern notch for light and a scattering extractor pattern for light.

FIG. 8A shows a luminaire 120 having a single specular extractor pattern notch 122 in addition to a scattering extractor pattern 116. The scattering extractor pattern 116 covers an exemplary angle about the circumference of luminaire 120 of 60°, whereas the corresponding angle for scattering extractor pattern 72 of FIGS. 6A-6C is 30°. These are typical angles of circumferential coverage.

Figure 8B:
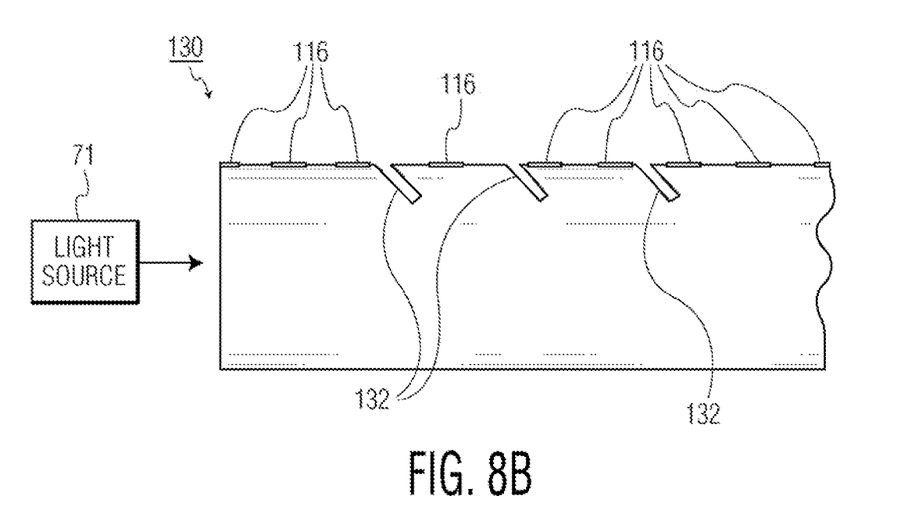
FIG. 8B is similar to FIG. 8A, but shows multiple specular extractor pattern notches for light in addition to a scattering extractor pattern for light.

As shown in FIG. 8B, more than one specular extractor pattern notch 132 may be used instead of a single specular extractor pattern notch 122 (FIG. 8A) in a specified region of the luminaire. Referring to both FIGS. 8A and 8B, typically one large single specular extractor pattern notch 122 can be used instead of multiple, smaller specular extractor pattern notches 132.

Figure 8C:
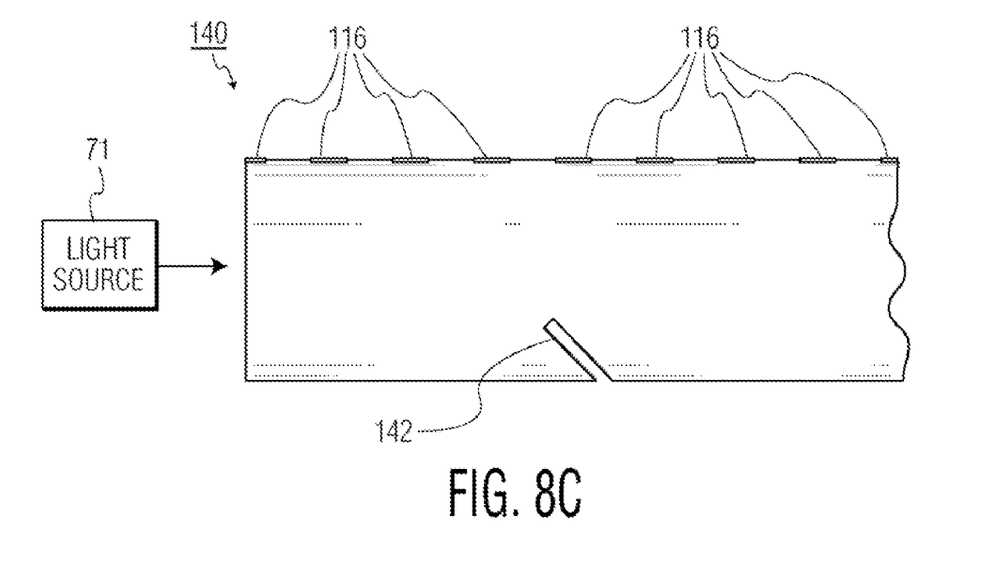

FIG. 8C shows a luminaire 140 having a single specular extractor pattern notch 142 in addition to a scattering extractor pattern 116. Specular extractor pattern 142 is located on the lower side of the luminaire, in contrast to specular extractor pattern 122 in FIG. 8A.

Figure 8D:
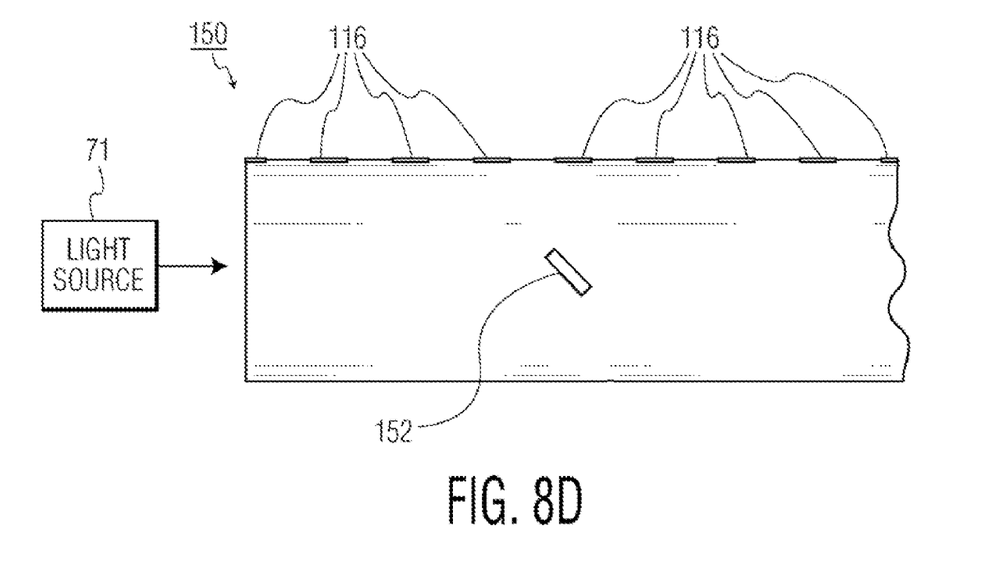
FIG. 8D is also similar to FIG. 5A, but shows a specular extractor pattern notch tunneling through the body of a luminaire.

Finally, FIG. 8D shows a luminaire 150 having a single specular extractor pattern notch 152 that tunnels through the body of the luminaire, preferably all the way through. More than one specular extractor pattern notch 152 can be used along the length of the luminiare, and such notches can also be offset in the vertical direction illustrated. The luminaire with the specular tunneling feature 152 can be formed by a molding operation. Or, by way of example, a luminaire can be severed at an angle of 45%, for instance, and then material removed from the severed end(s) to create a specular extractor pattern notch when the severed ends are then joined together with an optical index-matching adhesive.

On the other hand, FIGS. 8A-8D shows specular extractor pattern notches (e.g., 122) that do not result in removal of part of scattering extractor pattern 116. FIGS. 6A-6C show a specular extractor pattern notch 74 that results in removal of part of scattering extractor pattern 72. Either situation is acceptable.

Further, whereas the scattering extractor pattern described above is formed from strips of light-extraction material oriented laterally across a luminaire, a scattering extractor pattern can be formed from light-extraction material oriented in many ways. For instance, the light-extraction material for a scattering extractor pattern can be formed from random rectangles, random dots (i.e., non polygonal shapes), or longitudinal stripes. The lateral and longitudinal light-extraction efficiencies of a scattering extractor pattern may follow the teachings of above-mentioned U.S. patent application Ser. Nos. 11/366,711 and 11/108,279.

The foregoing describes the use of both scattering and specular extractor patterns for light to illuminate an elongated target area. This allows enhanced directional control over some of the light emitted by a luminaire, compared to using only a scattering extractor pattern.

While the invention has been described with respect to specific embodiments by way of illustration, many modifications and changes will occur to those skilled in the art. For instance, the specular extractor pattern can be formed in many shapes other than the notches designated herein. For instance, specular extractor patterns can comprise pyramids, curved surfaces, and holograms. It is, therefore, to be understood that the appended claims are intended to cover all such modifications and changes as fall within the true scope and spirit of the invention.

FIG. 2 illustrates the lack of a high degree of directionality for light extracted from a luminaire by a scattering extractor pattern. That figure shows an arrangement 30 of a single luminaire 32 employing a scattering extractor pattern 32a on a light-carrying member 32b. Scattering extractor pattern 32a, whose thickness is whose exaggerated, may comprise paint having titanium dioxide or other light-scattering particles, or may comprise a laser-etched pattern, by way of example Light-carrying member 32b may comprise an acrylic rod. More particularly, luminaire 32 may be formed as described in the U.S. patent applications Ser. Nos. 11/366,711 and 11/108,279. Application Ser. No. 11/366,711 entitled, "Luminaire with Improved Lateral illuminance Control," was filed on Mar. 2, 2006, and is assigned to the same joint owners as the present application; that is, Fiberstars, Inc. and Optical Research Associates. Application Ser. No. 11/108,279, entitled "Luminaire with Directional Side-Light Extraction," was filed on Apr. 18, 2005, and is assigned to the foregoing joint owners. A light source 33 supplies light to luminaire 32.

What is claimed is:

1. A fiberoptic luminaire with scattering and specular side-light extractor patterns, comprising:
   (a) a fiberoptic light pipe having a light-carrying core;
   (b) an elongated side-light emitting portion of the light pipe having a main axis and emitting tight from the side of the light pipe for illuminating a target area; the light pipe emitting light from said side by a side-light extractor pattern arrangement comprising:
      (i) a scattering extractor pattern for light and a specular extractor pattern for light, each of which directs light onto the target area;
      (ii) the scattering and specular extractor patterns being positioned on said side-light emitting portion so as to extract light from the side-light emitting portion over a radial angle, orthogonal to said main axis, of less than 180°;
      (iii) the scattering extractor pattern comprising a Lambertian type of extractor pattern and the specular extractor pattern comprising some or all of surface areas of one or more notches in the side-light emitting portion, each of which notches has a pair of main faces parallel to within 10° of each other; and
   (c) the specular extractor pattern extending over less than 20% of a length of the side-light extractor pattern arrangement along said main axis.

2. The luminaire of claim 1, wherein the specular extractor pattern is positioned near an input end of the side-light emitting portion, the input end receiving light from a main light source for the side-light emitting portion.

3. The luminaire of claim 1, wherein the light directed to the target area by the specular extractor pattern results in a peak of illuminance on the target surface along a path corresponding to the path of said side-light emitting portion.

4. The luminaire of claim 1, wherein the specular extractor pattern overlaps the scattering extractor pattern.

5. The luminaire of claim 1, wherein the Lambertian type of extractor pattern comprises paint.

6. The luminaire of claim 1 wherein the light extractor pattern arrangement is adjustable to accommodate the angular distributions of tight from each one of the tight sources of a metal halide lamp, an LED lamp or a halogen tamp, one at a time.

7. The luminaire of claim 1, wherein the specular extractor pattern extends over less than 5% of a length of the side-light extractor pattern arrangement along said main axis.

8. The luminaire of claim 1, in combination with:
 (a) a display case refrigerated to a temperature below 7C;
 (b) a light source for the fiberoptic light pipe placed outside the display case; and
 (c) the luminaire being placed inside of the display case.

9. A fiberoptic luminaire with scattering and specular side-light extractor patterns, comprising:
 (a) a fiberoptic light pipe having a light-carrying core; and
 (b) an elongated side-light emitting portion of the light pipe having a main axis and emitting light from the side of the light pipe for illuminating a target area; the light pipe emitting light from said side by a side-light extractor pattern arrangement comprising:
  (i) a scattering extractor pattern for light and a specular extractor pattern for light, each of which directs light onto the target area;
  (ii) the scattering and specular extractor patterns being positioned on said side-light emitting portion so as to extract light from the side-light emitting portion over a radial angle, orthogonal to said main axis, of less than 180°;
  (iii) the scattering and specular extractor patterns differing from each other in shape and type; and
  (iv) the scattering extractor pattern providing greater than 50% of tight on the target area in full and the light extracted by the specular extractor pattern producing an illuminance on a selected portion of the target area that is greater than 5% of the maximum illuminance produced on the target area by the scattering extractor pattern.

10. The luminaire of claim 9, wherein the first or last 20% of length of the target area along the side-light emitting portion of luminaire, from a light-receiving end of the luminaires, receives sufficient tight from the specular extractor pattern that the average illuminance on the foregoing length of the target area is at least about 0.3 times the average illuminance along the full length of the target area along the side-light emitting portion of luminaire.

11. The luminaire of claim 9, wherein the first and last 20% of length of the target area along the side-light emitting portion of luminaire, from the tight-receiving end of the luminaire, receives sufficient light from the specular extractor pattern that the average illuminance on the foregoing length of the target area is at least about 0.3 times the average illuminance along the full length of the target area along the side-light emitting portion of luminaire.

12. The luminaire of claim 9, wherein the first or last 20% of length of the target area along the side-light emitting portion of luminaire, from a light-receiving end of the luminaire, receives sufficient tight from the specular extractor pattern that the average illuminance on the foregoing length of the target area is at least about 0.7 times the average illuminance along the full length of the target area along the side-light emitting portion of luminaire.

13. The luminaire of claim 9, wherein the first and last 20% of length of the target area along the side-light emitting portion of luminaire from a light-receiving end of the luminaire, receives sufficient light from the specular extractor pattern that the average illuminance on the foregoing length of the target area is at least about 0.7 times the average illuminance along the full length of the target area along the side-light emitting portion of luminaire.

14. The luminaire of claim 9, wherein the scattering and specular extractor patterns both illuminate said selected portion of the target area.

15. The luminaire of claim 9, wherein:
 (a) the side-light emitting portion has an input end for receiving light from a main light source for the side-light emitting portion and a far end; and
 (b) said selected portion of the target area is located closer to the input end than the far end.

16. The luminaire of claim 15, wherein said selected portion of the target area includes an end of the target area along the length of the luminaire.

17. The luminaire of claim 9, wherein said selected portion of the target area includes a peak of illuminance that is aligned with some portion of a central 60% of length of the side-light emitting portion along said main axis.

18. The luminaire of claim 17, wherein the light extracted by the specular extractor pattern produces an illuminance on a selected portion of the target area that is at least about 1.3 times the maximum illuminance produced on the target area by the scattering extractor pattern.

19. The luminaire of claim 17, wherein the light extracted by the specular extractor pattern produces an illuminance on a selected portion of the target area that is at least about 1.7 times the maximum illuminance produced on the target area by the scattering extractor pattern.

20. The luminaire of claim 9, wherein said selected portion of the target area extends beyond an end of the side-light emitting portion of the luminaire along the main axis of the luminaire.

21. The luminaire of claim 20, wherein said end is an input end for receiving light from a main light source.

22. The luminaire of claim 9, wherein the specular extractor pattern comprises at least some or all surface area of one notch in the side-light emitting portion.

23. The luminaire of claim 9, wherein the scattering extractor pattern comprises a Lambertian type of extractor pattern.

24. The luminaire of claim 23, wherein the Lambertian type of extractor pattern comprises paint.

* * * * *